United States Patent
Zoppitelli et al.

(10) Patent No.: US 6,550,974 B2
(45) Date of Patent: Apr. 22, 2003

(54) BEARING ASSEMBLY FOR A HELICOPTER REAR TRANSMISSION SHAFT

(75) Inventors: Elio Zoppitelli, Velaux (FR); Claude Bocoviz, Allauch (FR); Jean-Pierre Jalaguier, Vitrolles (FR)

(73) Assignee: Eurocopter, Marignane (FR)

( * ) Notice: Subject to any disclaimer, the term of this patent is extended or adjusted under 35 U.S.C. 154(b) by 0 days.

(21) Appl. No.: 10/021,163

(22) Filed: Oct. 30, 2001

(65) Prior Publication Data

US 2002/0081047 A1 Jun. 27, 2002

(30) Foreign Application Priority Data

Dec. 12, 2000 (FR) .............................. 00 16142

(51) Int. Cl.[7] .............................................. F16C 19/06
(52) U.S. Cl. ...................................................... 384/498
(58) Field of Search ................. 384/498, 499, 384/519, 558, 583

(56) References Cited

U.S. PATENT DOCUMENTS 3,756,675 A    9/1973   Mangiavacchi
4,708,499 A   11/1987   Loeser
5,407,386 A    4/1995   Kish

FOREIGN PATENT DOCUMENTS

| FR | 1 066 180 | 6/1954 |
| FR | 2 786 828 | 6/2000 |
| GB | 1 050 612 | 12/1966 |

*Primary Examiner*—Lenard A. Footland
(74) *Attorney, Agent, or Firm*—Sturm & Fix LLP

(57) ABSTRACT

The rolling bearing 1 of this bearing assembly is of the relubricatable type and is mounted tightly on the shaft 4 by its inner race 2 in such a way as to be prevented from rotating and translating on the shaft, the latter for this purpose comprising a thrust shoulder 3. The outer race 6 of the rolling bearing is housed in a ball swivel with a spherical outer peripheral surface consisting of two half ball swivels 7 back to back and this ball swivel is itself mounted in the spherical housing 8 of a support consisting of two flanges 9, 10 arranged facing one another and slightly separated from one another in the axial direction prior to clamping. One 9 of these flanges may be fixed by lugs 11 to the structure of the craft and the other flange 10 may be fixed to the previous one using screws 12.

12 Claims, 4 Drawing Sheets

BEARING ASSEMBLY FOR A HELICOPTER REAR TRANSMISSION SHAFT

CROSS REFERENCE TO RELATED APPLICATIONS

This application claims priority of French Patent Application No. FR 00 16142 filed Dec. 12, 2000.

BACKGROUND OF THE INVENTION

1. Field of the Invention

The present invention relates to a bearing assembly intended to guide the rotation of a helicopter rear transmission shaft. In the production of such bearing assemblies it is necessary to take account of their number, their radial rigidity, in order to afford transmission which is subcritical or supercritical in terms of bending, and also to take into account their axial rigidity which governs the dynamic adaptation in this direction, once again in subcritical or supercritical mode. The bearing assembly has also to be suited to the type, relubricatable or otherwise, of rolling bearing used, to its method of alignment and also to the method of balancing the shaft carried by this bearing assembly.

2. Description of the Related Art

Bearing assemblies consisting of rolling bearings fixed, on the one hand, to a shaft by means of a rubber sleeve and, on the other hand, to a bearing assembly support by means of a rubber ring held on the structure of the craft by means of a strap or of a shaped metal sheet are already known. In other bearing assemblies, the rolling bearing is fixed by its inner race to a flange belonging to the shaft and by its outer race to a ball swivel immobilized using PTFE rings and making it possible to compensate, upon assembly, for any alignment defect the bearing assembly might exhibit. This outer race may also be fixed to a bearing assembly connected to a bearing assembly support by damping sleeves.

The disadvantages with bearing assemblies that have rubber rings lie in the introduction of an additional flexibility, the bearing assemblies thus becoming relatively stiff in the radial direction but more flexible in the axial direction, which means there is nothing actually opposing slippage in this direction or, subsequently, guaranteeing a precise reference along the axis of the transmission. This represents a definite drawback on a helicopter with a rear fenestron. The bearing assembly of the invention must instead provide the desired rigidities, both in the radial and axial directions, and to do so with satisfactory control over the clearances.

SUMMARY OF THE INVENTION

It is an object of the present invention therefore to obtain a true axial reference and good dynamic adaptability of the bearing in the axial and radial directions, with high stiffnesses so as to obtain subcritical transmission, and to do so with the bearing assembly being to a certain extent tolerant of defects in the orientation of the bearing supports. It is also desirable to achieve ease of maintenance with the possibility of greasing the rolling bearing and checking its tough spots.

To this end, a bearing assembly for a helicopter rear transmission shaft comprising a rolling bearing fixed by its inner race to the said transmission shaft and means for connecting its outer race to the structure of the craft, is, according to the present invention, characterized in that the said rolling bearing is of the relubricatable type and is mounted tightly on the said shaft by its inner race in such a way as to be prevented from rotating and translating on the shaft, the latter for this purpose comprising a thrust shoulder, in that the outer race of the rolling bearing is shaped as a ball swivel or housed in a ball swivel with a spherical outer peripheral surface consisting of two half ball swivels back to back, and in that the said ball swivel is itself mounted in the spherical housing of a support consisting of two flanges arranged facing one another and slightly separated from one another in the axial direction prior to clamping, namely a support flange which can be fixed by lugs to the said structure of the craft and an adjusting flange that can be fixed to the previous one using screws.

It is also possible to provide elastic O-rings for centering the two half ball swivels on the outer race of the rolling bearing, these rings also holding the half ball swivels during an operation of setting up the rolling bearing.

Thus, the two half ball swivels make it possible, during assembly, for the operation of setting up the rolling bearing to compensate for the defect of orientation of the support and also to avoid excessive loading of the rolling bearing, and to do this without the need to use shims or to carry out an adjustment of the alignment. Furthermore, the elastic rings make it possible to avoid the disadvantage of the outer race of the rolling bearing being mounted tightly in its ball swivel, as this would be incompatible with the small internal clearance of the rolling bearing. As far as the adjusting flange is concerned, it will make it possible to immobilize the outer race of the rolling bearing once the orientation of the rolling bearing has been adjusted and the aforementioned screws on the support flange which provides the connection with the structure have been tightened. Prior to tightening, the axial spacing between the two flanges is between defined lower and upper limits; the tightening of the screws which fix the said adjusting flange to the support flange provides control over the rotational immobilization of the rolling bearing and control over the stresses acting on the flange. This tightening is performed until such point as the two flanges make contact with one another, or without them making contact, depending on whether the adjusting flange is a split flange or a non-split flange, as will be seen more clearly later on.

In principle, the use of the half ball swivels makes it possible to avoid compulsory use of a rolling bearing with a spherical outer race, although this is still possible, as was envisaged above, in which case the bearing assembly would amount simply to such a rolling bearing with a spherical outer race mounted in the spherical housing of the two-flange support.

According to another provision of the present invention, it is also possible to envisage the bearing assembly for a transmission shaft comprising on the one hand, an intermediate ring which can seize under the effect of heat and is mounted between the ball swivel and the outer race of the bearing, the outside and inside diameters of this intermediate ring having a calibrated eccentricity defect and, on the other hand, an accelerometer connected to a system for capturing the imbalance and misalignment of the shaft.

Thus, in the case of degradation to the rolling bearing, the increase in the temperature leads to seizure of the ring and thereafter to expansion of the assembled parts. As these expansions are differential because of the different nature of the materials of which these parts are made (dural in the case of the ball swivel and the flanges, steel in the case of the rolling bearing and, for example, titanium in the case of the intermediate ring), they will cause the rolling bearing to become immobilized in this ring and release it in its housing. The shaft will then rotate about the outside diameter of the intermediate ring, with an eccentricity defect that gives rise to a calibrated imbalance detected by the capture system, which provides warning that the rolling bearing has become degraded.

In an alternative form, the bearing assembly for a transmission shaft comprises, on the one hand, an intermediate ring which can seize under the effect of heat and is mounted between the ball swivel and the outer race of the bearing, the outside and inside diameters of this intermediate ring having a calibrated misalignment and, on the other hand, an accelerometer connected to a system for capturing the imbalance and misalignment of the shaft.

In this case, rotation after the bearing has become immobilized in the intermediate ring will be with a misalignment which is also detected by the capture system.

Advantageously, the said intermediate ring is made of titanium and is coated at its periphery with a fabric based on a material with a low coefficient of friction, for example PTFE.

BRIEF DESCRIPTION OF THE DRAWINGS

Exemplary embodiments of the invention have been depicted in axial section in the appended FIGS. 1 and 2, FIGS. 1a and 2a being the corresponding front views of the bearing assemblies.

DETAILED DESCRIPTION OF THE INVENTION

Figure 1A:
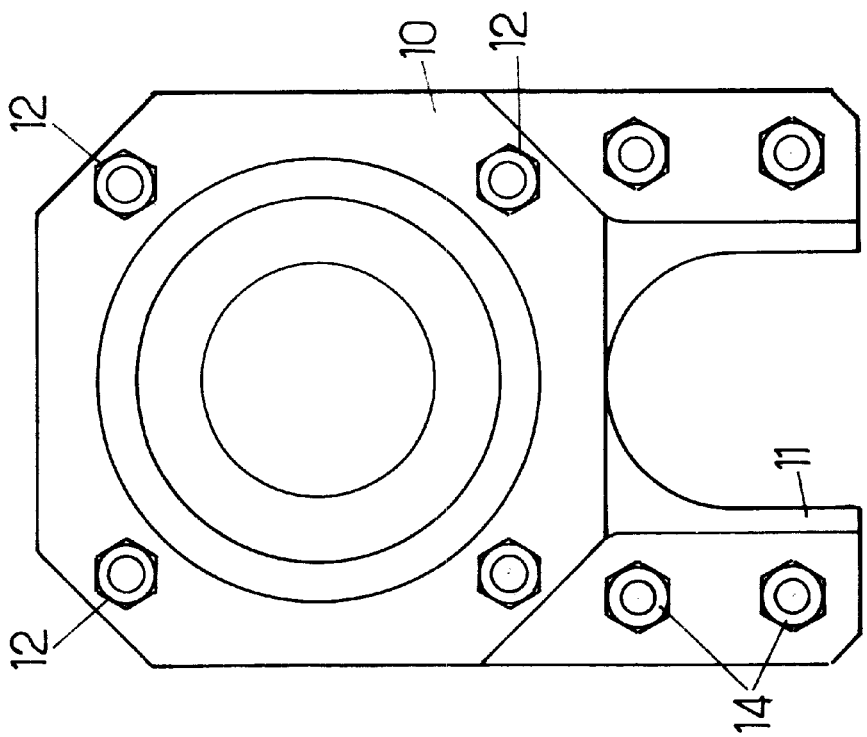
Figure 1:
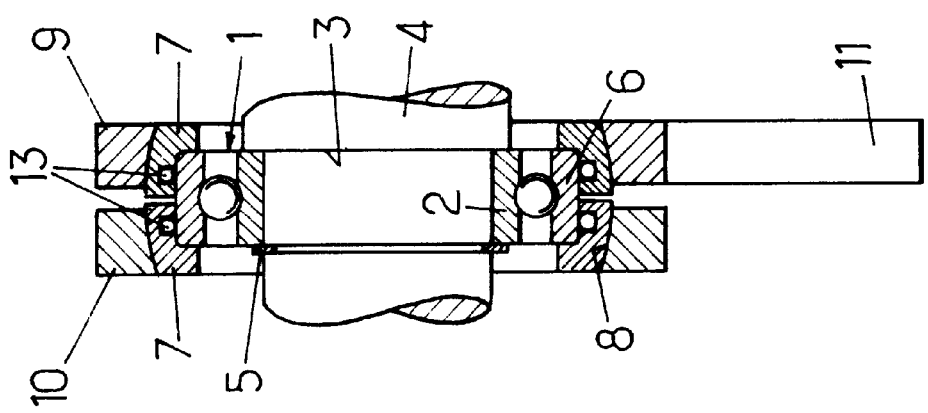

In FIGS. 1 and 1a, the relubricatable rolling bearing 1 is immobilized by its inner race 2 between a shoulder 3 of the shaft 4 and a stop ring 5, and its outer race 6 is mounted in a ball swivel made up of two half ball swivels 7 with spherical outer peripheral surfaces. These half ball swivels are themselves mounted in a spherical housing 8 of a support made up of two flanges, one of them a support flange and the other an adjusting flange, 9 and 10 respectively, arranged facing each other and slightly separated from one another in the axial direction prior to clamping. The support flange 9 may be fixed by lugs 11 to the structure (not depicted) of the craft, and the adjusting flange 10 may be fixed to the previous flange by means of four screws 12. Elastic O-rings 13 for centring the two half ball swivels 7 on the outer race 6 of the bearing, with the aforementioned effects, have also been provided. Finally, 14 references the screws which fix the lugs 11 to the fixed structure.

Figure 2:
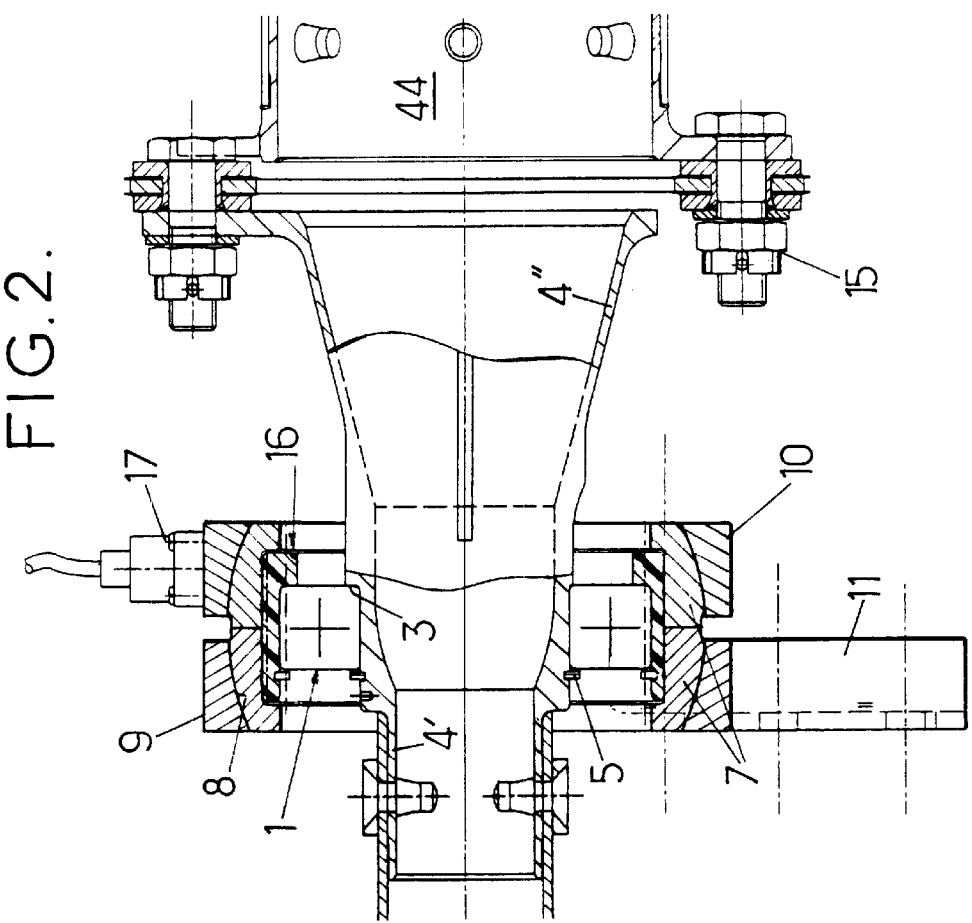
Figure 2A:
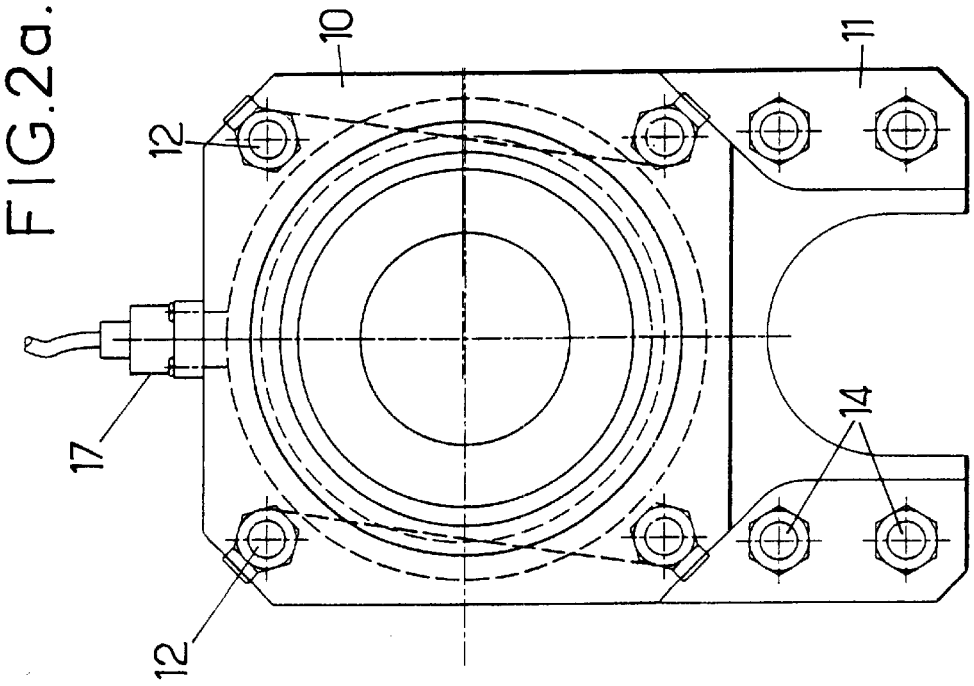

In the embodiment of FIGS. 2 and 2a, the references 1, 3, 5, 7 to 12 and 14 denote the same elements as in the previous figures. The shaft 4' in this instance is tubular and the rolling bearing 1 is immobilized between a shoulder 3 of a connecting flange 4' which provides connection, via a flexible coupling and bolts 15, to the next shaft 44, and a stop ring 5 similar to that of FIG. 1. An intermediate ring 16 which can seize under the effect of heat is here shown between the ball swivel 7 and the outer race of the rolling bearing 1, the outside and inside diameters of this intermediate ring 16 having a calibrated eccentricity defect or a calibrated misalignment, this being for the purpose and with the results indicated earlier. Finally, 17 depicts the accelerometer fixed to the flange 10, connected to a system (not depicted) for capturing the imbalance and misalignment of the shaft and thereafter making it possible to detect that the rolling bearing 1 has seized.

Figure 3:
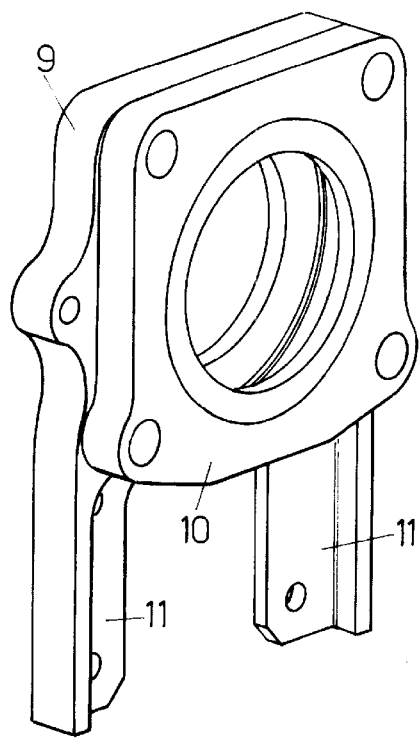
FIG. 3 is a perspective view of a support flange and of a non-split adjusting flange.
Figure 5:
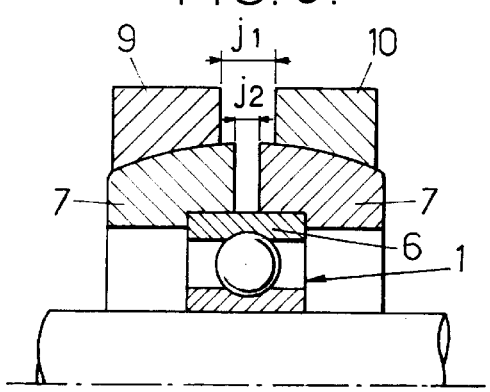
FIG. 5 is a view in axial part section of the bearing assembly of the invention, showing the axial clearances between the flanges, on the one hand, and between the half ball swivels on the other hand.
Figure 4:
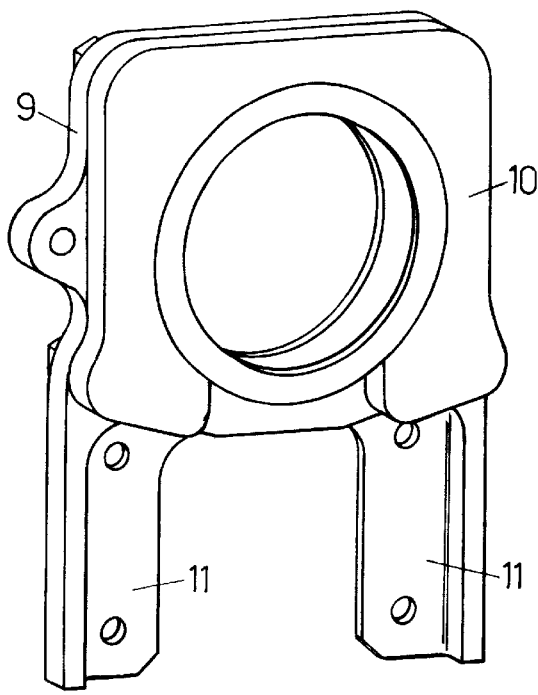
FIG. 4 is a perspective view of a support flange and of a split adjusting flange.

As indicated earlier on, the adjusting flange 10 may be a non-split or split. The expression "non-split flange" is to be understood as denoting a flange consisting of a rigid plate having a central opening with a closed outline (cf. FIG. 3) for the passage of the corresponding half ball swivel 7, and is always the case with the support flange. It will be appreciated that such an adjusting flange will have good radial rigidity. The expression "split flange" is to be understood as meaning, on the other hand, a flange consisting of a rigid U-shaped plate (cf. FIG. 4) and therefore having, for the passage of the corresponding half ball swivel 7, a central opening with an open outline. It will be appreciated that such a split flange will be radially and elastically deformable when pressed axially onto the spherical exterior surface of the corresponding half ball swivel or onto the spherical surface of the outer race of the rolling bearing, in the case of this embodiment. This gives rise to different methods for adjusting the tightness of the rolling bearing, according to whether the adjusting flange is a non-split or split (see also FIG. 5).

In the case of a non-split adjusting flange 10 (FIG. 3), the initial axial clearance j1 between the two flanges 9 and 10 cannot be zero because the force of tightening the screws that fix the adjusting flange 10 to the support flange 9 would pass directly through these flanges with no clamping effect on the half ball swivels and therefore on the rolling bearing. This clearance j1 may in fact be relatively large. Once the screws have been tightened, this clearance reduces but must not disappear, in order to avoid excessive mechanical stress on the half ball swivels 7 and on the outer race 6 of the rolling bearing 1. In consequence, a tightening torque will be imposed on the screws that fix the adjusting flange 10 to the support flange 9. In all cases, the clearance j2 between the two half ball swivels 7 must not be zero either, because if it were zero the rolling bearing 1 would not be able to be immobilized.

In the case of a split flange, which is far more flexible in the radial direction and which may incidentally be made of a light alloy, it is necessary to calculate the clearances j1 and j2 with consideration to the following: the initial clearance j1 between the adjusting flange 10 and the support flange 9 needs to be small so as to avoid excessive mechanical stress, given that in this case it is intended that, after the clamping of the adjusting flange 10 onto the support flange 9, these two flanges will be in contact with one another (j'1=0), which must determine the clamping of the rolling bearing. The initial clearance j2 will need to be greater than a non-zero value j'2 obtained upon clamping, and j1 will therefore become j'1=0 after clamping, j2 becoming j'2 which is non-zero. It will be understood that j1 will need to be adapted to slightly deform the split adjusting flange 10 and apply pressure to the various elements in the path of the forces through the contacting parts, this being in order to apply sufficient pressure to the half ball swivels and immobilize the rolling bearing. This clearance j1 will, however, need to be quite small so that it can reduce after clamping to j'1=0 for the aforementioned contact between the adjusting flange 10 and the support flange 9, so as to prevent the operator being able to apply an excessive tightening torque that will carry the risk of applying excessive pressure to and damaging the two half ball swivels through a wedge effect caused by the wedging of the two half swivels against the flanges.

It is also important to point out that the fixing of the adjusting flange 10 to the support flange 9 by four bolts or screws makes the entirety of the bearing assembly fail-safe, because there would be no serious consequence if one of these fixing means were to break or of the split flange 10 were to break into two or three pieces, because this flange would still remain in place and assume most of its function.

Figure 8:
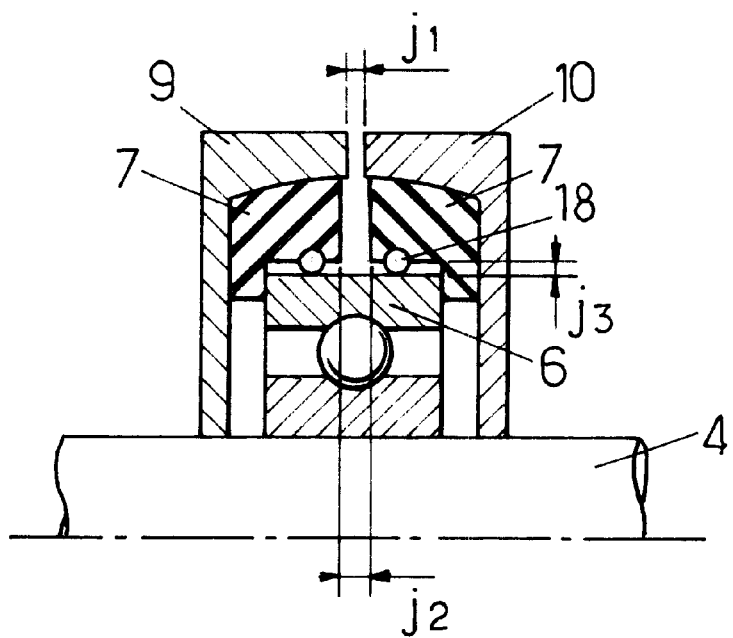
FIGS. 8 and 9 are part views in axial section of a bearing assembly of the type depicted in FIG. 5, showing the existence of a radial clearance between the ball swivel and the outer race of the rolling bearing.
Figure 9:
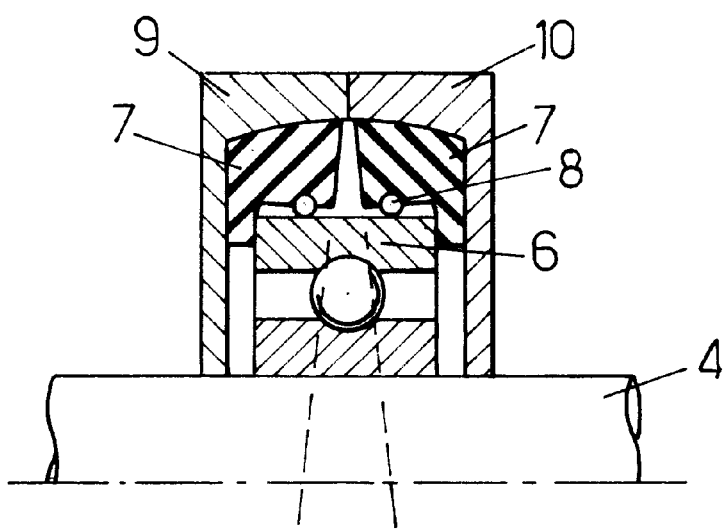

FIGS. 8 and 9 show the advantage there is to be had in providing a radial clearance j3 between the ball swivel, here consisting of the two half ball swivels 7, and the outer race 6 of the rolling bearing. What this clearance does is make it possible to prevent the bearing cage from being compressed in the radial direction when the two flanges 9, 10 are clamped one onto the other. In this case, two rings 18 are inserted in this clearance j3 to centre the two half ball swivels 7 and keep them in position.

Figure 6:
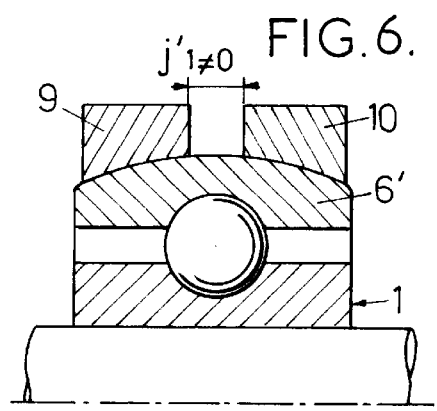
FIG. 6 is a part view in section of another embodiment of a bearing assembly according to the invention, in the case of a rolling bearing with an outer race that has a spherical surface, the bearing assembly therefore not having half ball swivels, with a non-split adjusting flange.

In the embodiment of FIG. 6, where the support flange 9 and the non-split adjusting flange 10 are of the same type as previously, there are not any half ball swivels, this role being performed by an outer race with a spherical peripheral surface 6' belonging to the rolling bearing 1. In this case, the clearance j'1 after adjustment is other than 0 for the same reasons as those mentioned above, adjustment being achieved by limiting the tightening torque exerted on the screws or bolts of the connection between the two flanges. It should be noted that this solution dictates that there be a greater radial clearance in the rolling bearing, because the pressure applied directly to the outer race of the rolling bearing carries the risk of reducing its natural radial clearance, which is generally very small, and consequently of damaging it.

Figure 7:
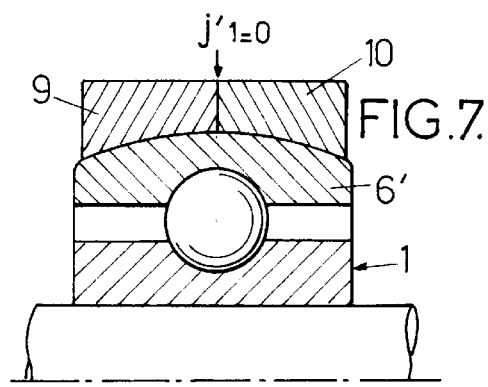
FIG. 7 is a view similar to that of FIG. 6, with a split adjusting flange.

In the embodiment of FIG. 7, the final axial clearance j'1 after clamping may be zero, because clamping is done with programmed radial deformation of the split adjusting flange 10, as in the embodiment with the half ball swivels.

The present invention has the advantage of allowing the use of the same standard rolling bearing for each of a certain number of bearing assemblies on one portion of a helicopter rear transmission shaft, even if these bearing assemblies need to have different characteristics, for example avoiding the use of a special self-aligning rolling bearing in the case of one of them, and thereby the risk of muddling rolling bearings of different types in one and the same transmission.

Furthermore, the "swivel action" is possible when mounting and setting up on a helicopter, prior to complete clamping. Then, if dynamic misalignments occur, they are compensated for by the clearances in the rolling bearing.

What is claimed is:

1. Bearing assembly for a helicopter rear transmission shaft comprising a rolling bearing fixed by its inner race to the said transmission shaft and means for connecting its outer race to the structure of the craft, said rolling bearing is of the relubricatable type and is mounted tightly on the said shaft by its inner race in such a way as to be prevented from rotating and translating on the shaft, the latter for this purpose comprising a thrust shoulder, in that the outer race of the rolling bearing is shaped as a ball swivel or housed in a ball swivel with a spherical outer peripheral surface consisting of two half ball swivels back to back, and in that the said ball swivel is itself mounted in the spherical housing of a support consisting of two flanges arranged facing one another and slightly separated from one another in the axial direction prior to clamping, namely a support flange which can be fixed by lugs to the said structure of the craft and an adjusting flange that can be fixed to the previous one using screws.

2. A bearing assembly according to claim 1, comprising elastic O-rings for centring the two half ball swivels on the outer race of the rolling bearing, these rings also holding the half ball swivels during an operation of setting up the said rolling bearing.

3. A bearing assembly for a transmission shaft according to claim 1, comprising, on the one hand, an intermediate ring which can seize under the effect of heat and is mounted between the ball swivel and the outer race of the bearing, the outside and inside diameters of this intermediate ring having a calibrated eccentricity defect and, on the other hand, an accelerometer connected to a system for capturing the imbalance and misalignment of the shaft.

4. A bearing assembly according to claim 3, wherein said intermediate ring is made of titanium and is coated at its periphery with a fabric based on a material with a low coefficient of friction.

5. A bearing assembly according to claim 4, characterized in that the said material with a low coefficient of friction is PTFE.

6. A bearing assembly according to claim 1, wherein a clearance is left between the ball swivel and the outer race of the said rolling bearing.

7. A bearing assembly according to claim 1, wherein the adjusting flange comprises a rigid plate having a central opening with a closed outline for the passage of the corresponding half ball swivel.

8. A bearing assembly according to claim 7, comprising a non-zero initial axial clearance between the two flanges, this clearance reducing after the fixing screws have been tightened, but without disappearing, there also being prescribed a tightening torque for the said screws when pressurizing the adjusting flange on the support flange, the clearance between the two half ball swivels likewise being non-zero upon assembly, and decreasing as the screws are tightened.

9. A bearing assembly according to claim 1, wherein the said adjusting flange comprises a rigid U-shaped plate comprising, for the passage of the corresponding half ball swivel, a central opening with an open outline.

10. A bearing assembly according to claim 9, wherein the initial clearance between the adjusting flange and the support flange is small, it being anticipated that, once these two flanges have been clamped together, they will be in contact with one another to determine the clamping of the rolling bearing, the initial clearance between half ball swivels being greater than a non-zero value obtained upon clamping.

11. A bearing assembly for a transmission shaft according to claim 1, comprising, on the one hand, an intermediate ring which can seize under the effect of heat and is mounted between the ball swivel and the outer race of the bearing, the outside and inside diameters of this intermediate ring having a calibrated misalignment and, on the other hand, an accelerometer connected to a system for capturing the imbalance and misalignment of the shaft.

12. A bearing assembly according to claim 11, wherein said intermediate ring is made of titanium and is coated at its periphery with a fabric based on a material with a low coefficient of friction.

* * * * *